(12) United States Patent
Lueh

(10) Patent No.: US 6,895,579 B2
(45) Date of Patent: May 17, 2005

(54) METHOD AND APPARATUS FOR MAINTAINING EXCEPTION REPORTING FOR REGISTER PROMOTION

(75) Inventor: Guei-Yuan Lueh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 628 days.

(21) Appl. No.: 09/920,274

(22) Filed: Jul. 31, 2001

(65) Prior Publication Data

US 2003/0079211 A1 Apr. 24, 2003

(51) Int. Cl.⁷ .................................................. G06F 9/45
(52) U.S. Cl. ....................... 717/148; 717/116; 717/118; 717/131; 717/154
(58) Field of Search ................................. 717/108, 114, 717/116, 118, 124–134, 138–141, 146, 148, 151–154, 158; 714/34, 35, 38, 48

(56) References Cited

U.S. PATENT DOCUMENTS 6,202,204 B1 * 3/2001 Wu et al. .................... 717/151
2002/0010911 A1 * 1/2002 Cheng et al. ................... 717/4

* cited by examiner

Primary Examiner—Antony Nguyen-Ba
(74) Attorney, Agent, or Firm—Blakely, Sokoloff, Taylor & Zafman LLP

(57) ABSTRACT

A method and apparatus which comprises, as part of compiling source code into native code, identifying a source code block in the source code to optimize using register promotion, and optimizing the source code block using a register promotion transformation. Thereafter, compensation native code is generated to update those memory locations whose values were promoted using register promotion with the up-to-date values from registers associated with the memory locations. As a result native code corresponding to any existing source code exception handler associated with the source code block will have access to the up-to-date memory locations during program execution.

19 Claims, 5 Drawing Sheets

METHOD AND APPARATUS FOR MAINTAINING EXCEPTION REPORTING FOR REGISTER PROMOTION

FIELD OF THE INVENTION

This invention relates to compilers, and more particularly, to compilers that perform code optimization.

BACKGROUND

Compilers are programs that translate a source program written in a source language into a target program written in a target language. For example, a compiler may translate a program written in a high level language (such as C++) into compiled code that can be understood by a processor. During compiling a source program into a target program, certain optimizations can be made which can significantly improve running time and/or space requirements of the target program.

One technique of optimizing target code includes register promotion. With this technique, sections of code are identified in which it is safe to move values of data objects from memory to registers. These sections of code are then re-written in order to recall those values from the registers instead of from memory. Register promotion is regarded as a form of code optimization because instructions generated to access data objects in registers are more efficient than the same instructions accessing the data objects from memory.

Certain programming languages require exceptions to be accurately reported. This means that all effects of statements executed and expressions evaluated before the point at which an exception occurred should appear to have taken place.

One programming language requiring precise exception reporting is Java (™). Java (™) which was developed by Sun Microsystems, Inc. of Palo Alto, Calif. has become very popular. One advantage of Java (™) is that it is a compact platform-neutral-object-oriented programming language that, when compiled, represents instructions as platform-independent byte codes. These byte codes can be translated using a compiler such as the Just-In-Time (™) (JIT) compiler, that converts the Java (™) byte codes into instructions within the native instruction set of a particular hardware platform.

Code optimization using register promotion, as discussed above can result in an imprecise exception. Because of the requirement of the precise exception reporting, during compilation of Java(™) code, the JIT compiler must ensure that any optimization transformation does not violate the precise exception reporting semantic.

One way of satisfying the precise exception reporting semantic is to analyze sections of the code in which it is desired to perform register promotion in order to determine whether a possibility of violating the semantic exists. If it exists then the register promotion transformation is not performed. This is a very conservative approach which leaves the original code in unoptimized form.

DETAILED DESCRIPTION

The invention provides a method for use in the compilation of a source code program into native machine code. Although the invention may be used in the compilation of any source code program into native machine code, the invention will be described with reference to the compilation of a source code program written in the Java(™) programming language into native machine code. The invention may be used using a static or dynamic compiler. Further, the invention may be implemented in a binary translator.

Figure 1:
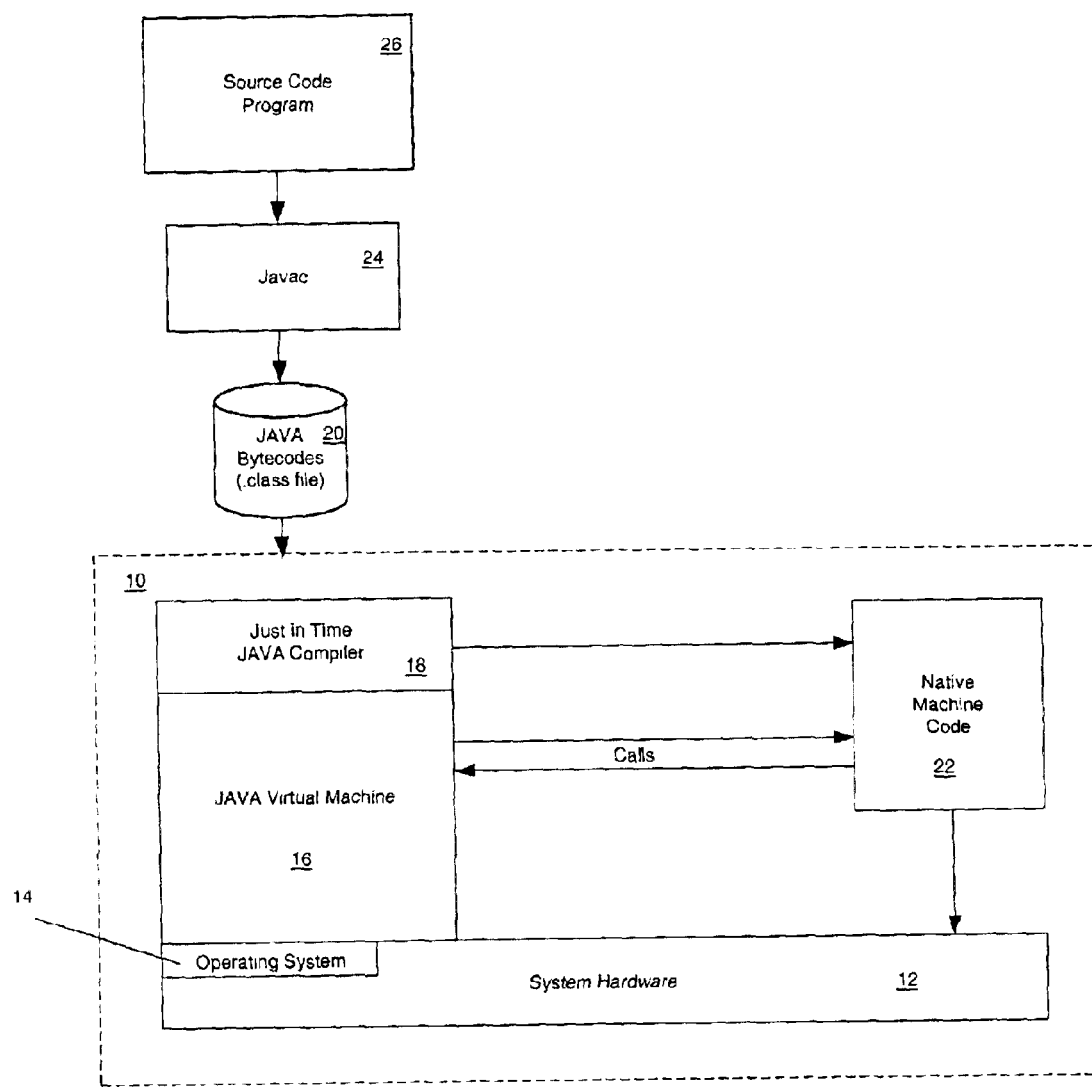
FIG. 1 shows an architectural drawing of a virtual machine in which the invention may be practiced.

In one embodiment, prior to run time, Java(™) application code and supporting libraries are translated to an intermediate form called byte codes. This is typically accomplished using a standard Java(™) translator, such as Javac. At run time, these byte codes are dynamically downloaded to a target system via a run time environment called a Virtual Machine (VM). A typical target system 10 is illustrated in FIG. 1 of the drawings. The target system 10 includes system hardware 12 which is controlled by an operating system 14. The various components making up system hardware 12 are described with reference to FIG. 5 of the drawings. The system 10 comprises a Java Virtual Machine 16 which includes a Just-In-Time Java compiler 18. The Java Just-In-Time compiler 18 translates Java byte code 20 residing in a class file into native machine code 22, the Java byte code 20 having been generated by a Java compiler 24 e.g. JAVAC from a source code program 26. The native machine code 22 can be executed directly by the system hardware 12.

One feature of the Java(™) language is that it requires accurate exception reporting. This means that when an exception occurs, statements executed and expressions evaluated before the point from which the exception occured should appear to have taken place. As part of its syntax, Java(™) includes catch and try statements which can be used by a programmer in order to satisfy this requirement of accurate exception reporting.

Briefly, a programmer creates a try statement which encapsulates a block of code which has one or more associated catch clauses for catching exceptions occurring during execution of the block. When an exception is encountered during execution of the try block, program control will be transferred to the first associated catch clause and thereafter to each successive associated catch clauses in turn, until an appropriate catch clause for handling the type of exception is found.

As an example, consider the piece code shown below, written in the Java(™) programming language.

```
class A {
    public int sum;
}
class excp {
    public static void main (String[ ] arg) {
        int a_arr [ ] = new mt [10];
        int b_arr [ ] = {0, 1, 2, 3, 4, 5, 6, 7, 8, 9};
        A a = new A();
        try{
```

-continued

```
        for(int i = 0; i < 11; i++) {
            a_rr = a.sum;
            a.sum = a.sum + b_arr [i];
        }
    }
    catch (ArrayIndexOutOfBoundsException e) {
        if (a.sum == 45)
            System.out.println ("correct" + a.sum);
        else
            System.out.println ("fail" + a.sum);
    }
}
```

The code shows a loop within a try-block initializing a_arr and summing up b_arr. Within the loop, an ArrayIndexOutOfBoundsException occurs in the last iteration (i=10). The catch block catches the ArrayIndexOutOfBoundsException and examines object a's field (sum) to see if the sum is correct.

In the above example, every a.sum instance is a field access. Typically in practice, a conventional Just-In-Time compiler would turn each field access into a memory access. This is typically undesirable as generating memory accesses creates the potential possibility of cache misses and may result in longer latencies than register accesses. It is thus desirable to turn all a.sum accesses into register accesses.

One embodiment of the invention uses a technique known as register promotion which allows a value which normally resides in memory to reside in a register for sections of the program. Within those sections of the program, references to the value are rewritten to refer to the register.

In one embodiment, a register promotion transformation for the try block shown above is shown below:

```
        r_sum = a.sum; // (1)
        for (int i = 0; i < 11; i++) {
            a_arr[i] = r_sum; // (2)
            r_sum = r_sum + b_arr[i];
        }
        a.sum = r_sum; // (3)
```

The transformation initializes a register r_sum with a.sum at the loop entry (see line (1)), replaces all a.sum references within the loop with r_sum and (see line (2)), stores the value r_sum back to a.sum at the end of the loop (see line (3)).

It will be appreciated that the above transformation leaves the object "a" in an inconsistent memory state within the loop. Thus, if an exception occurs, for example an IndexOutOfBounds exception, in the loop then the exception reporting semantic will be violated. According to one aspect of the invention, compensation code is generated which sets a.sum to r_sum whenever an exception occurs in the loop.

Figure 2:
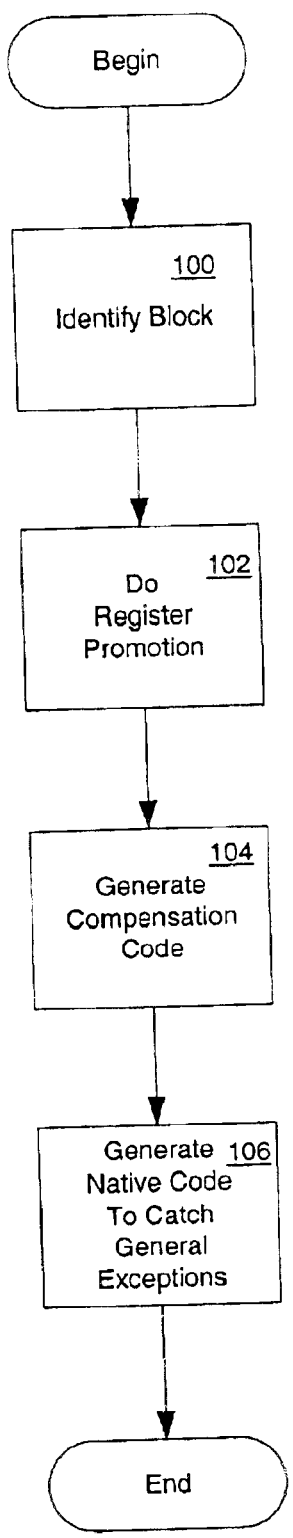
FIG. 2 shows a flow chart illustrating the compilation of byte codes into native machine code, in accordance with one embodiment of the invention.

Referring now to FIG. 2 of the drawings, a high level flow chart is shown illustrating one embodiment of the invention. At 100 the native code 22, corresponding to the original byte code 20, is examined in order to identify a block with which to do register promotion. At 102 a register promotion transformation is applied to the identified block. At 104 compensation code is generated in the native code 22 and at 106 a general exception handler is generated in the native code 22 to catch general exceptions as will be described in detail below.

Figure 3:
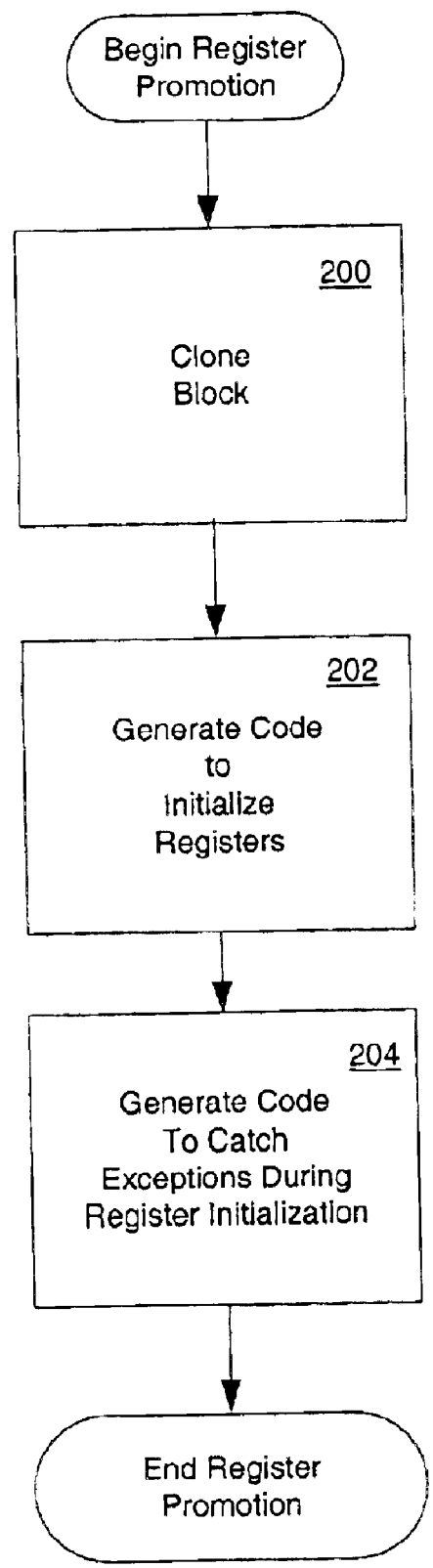
FIG. 3 shows a flow chart illustrating register promotion in greater detail.

The details of doing register promotion according to one embodiment is illustrated in the flow diagram of FIG. 3, in which the try block example has been chosen as the identified block in order to facilitate discussion. Referring to FIG. 3, at 200 the native code 22 corresponding to the try block is re-written or cloned. In other words, the native code 22 corresponding to the register promotion transformation shown above is generated. At 202 code to initialize the registers is generated which includes code to determine whether or not an exception occurred during register initialization such as, for example, the null pointer exception. At 204 native code to handle exceptions which occur during register initialization is generated.

Figure 4:
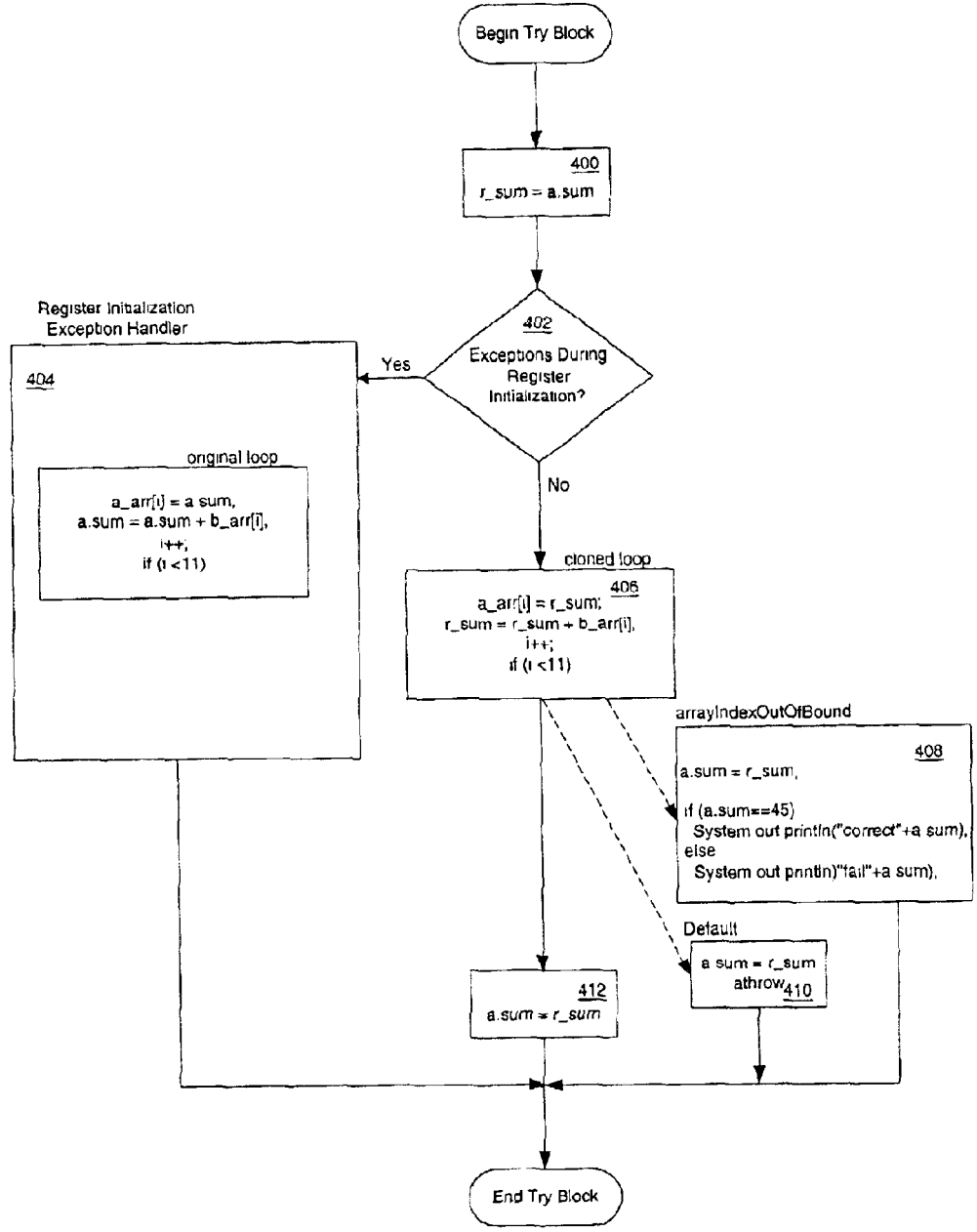
FIG. 4 shows a flow chart illustrating program control during execution of a Java try block, after compilation.

The flow diagram of FIG. 4 illustrates one embodiment of program control during execution of the try block example in native code. At 400 a register initialization step is performed in which r_sum is set to a.sum. At 402 a determination is made as to whether or not any exceptions occurred during register initialization. For example a null pointer exception could occur during register initialization. If this is the case then at 404 the native code to handle exceptions occurring during register initialization is executed which in this example causes the original loop to be executed instead of the cloned loop. If no register initialization error occurred then at 406 the cloned loop which includes the register promotion transformation is executed. Upon the occurrence of exceptions e.g. ArrayIndexOutOfBound, program control is transferred to dedicated exception handlers which have been modified to include compensation code: "a.sum=r_sum" at 408 in accordance with the invention. At 410 a dedicated exception handler is executed which consists of the compensation code: "a.sum=r_sum" and the statement "athrow". If no exception occurred during execution of the cloned try block loop then at 412 a.sum is set r_sum and the loop exits normally.

Figure 5:
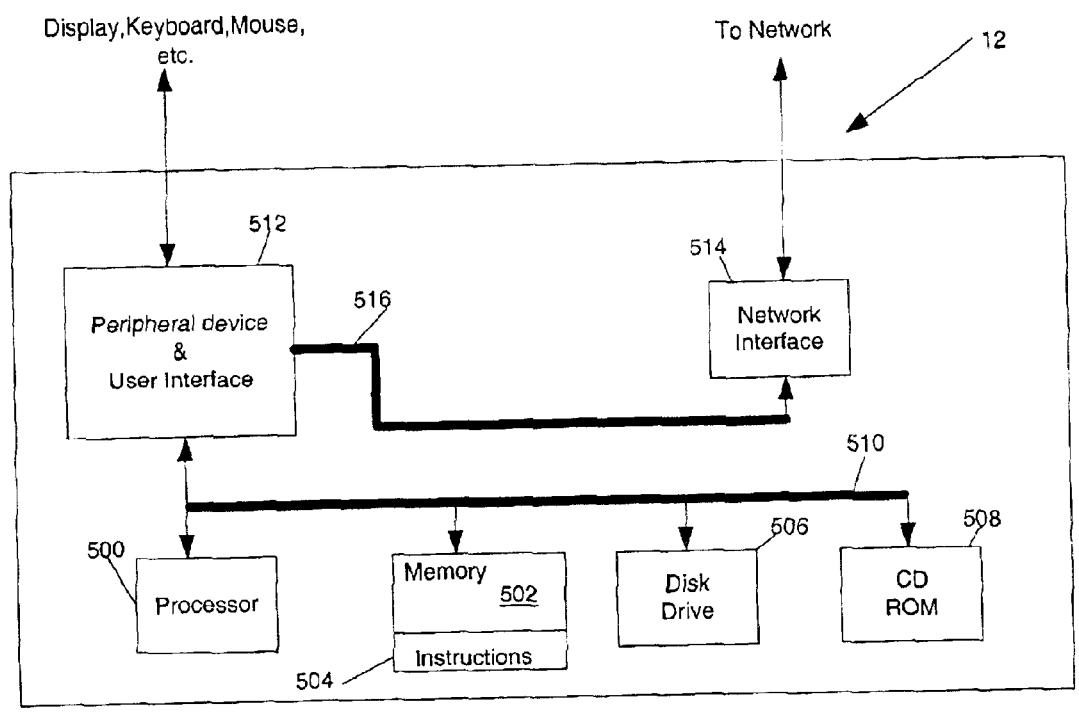
FIG. 5 shows a diagrammatic representation of exemplary hardware within which a set of instructions according to the methodology of the invention may be executed.

Referring now to FIG. 5 of the drawings, various components making up system hardware 12 are shown in block form. Referring to FIG. 5 of the drawings it will be seen that system hardware 12 includes a memory 502, which may represent one or more physical memory devices, which may include any type of random access memory (RAM) read only memory (ROM) (which may be programmable), flash memory, non-volatile mass storage device, or a combination of such memory devices. The memory 502 is connected via a system bus 510 to a processor 500. The memory 502 includes instructions 504 which when executed by the processor 500 cause the processor to perform the methodology of the invention as discussed above. Additionally the system 12 includes a disk drive 506 and a CD ROM drive 508 each of which is coupled to a peripheral-device and user-interface 512 via bus 510. Processor 500, memory 502, disk drive 506 and CD ROM 508 are generally known in the art. Peripheral-device and user-interface 512 provide an interface between system bus 510 and various components connected to a peripheral bus 516 as well as to user interface components, such as display, mouse and other user interface devices. A network interface 514 is coupled to peripheral bus 516 and provides network connectivity to system 12.

For the purposes of this specification, a machine-readable medium includes any mechanism that provides (i.e. stores and/or transmits) information in a form readable by a machine (e.g. computer) for example, a machine-readable medium includes read-only memory (ROM); random access memory (RAM); magnetic disk storage media; optical storage media; flash memory devices; electrical, optical, acoustical or other form of propagated signals (e.g. carrier waves, infra red signals, digital signals, etc.); etc.

It will be apparent from this description the aspects of the present invention may be embodied, at least partly, in software. In other embodiments, hardware circuitry may be used in combination with software instructions to implement the present invention. Thus, the techniques are not limited to any specific combination of hardware circuitry and software.

Although the present invention has been described with reference to specific exemplary embodiments, it will be evident that various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method comprising:
    identifying a source code block in source code;
    transforming the source code block including transforming references to values stored in memory locations into references to corresponding values stored in registers associated with the memory locations; and
    generating compensation native code to update each memory location with a value from an associated register to provide native codes corresponding to a source code exception handler associated with the source code block, access to the updated memory locations.

2. The method of claim 1, comprising generating exception-handling code to handle any exception not handled by the native code corresponding to existing source code exception handlers.

3. The method of claim 1, wherein the compensation native code forms part of the native code corresponding to an exception handler.

4. The method of claim 1 further comprising generating native code to initialize the registers; and generating register-initialization exception-handling native code to handle exceptions occurring during register initialization.

5. The method of claim 4, wherein the register-initialization exception-handling native code allows native code corresponding to the source code block to be executed if an error occurs during register initialization.

6. The method of claim 1, wherein the source code is in the form of byte codes compiled by a compiler.

7. The method of claim 1, performed by a Just-In-Time compiler.

8. A machine-readable medium that provides instructions, which when executed by a processor, cause the processor to perform operations comprising:
    identifying a source code block in source code;
    transforming the source code block, including transforming references to values stored in memory locations into references to corresponding values stored in registers associated with the memory locations; and
    generating compensation native code to update each memory location with a value from an associated register to provide native code, corresponding to a source code exception handler associated with the source code block, access to the updated memory locations.

9. The machine-readable medium of claim 8, wherein said instructions when executed further cause said processor to perform operations comprising generating exception-handling code to handle any exception not handled by the native code corresponding to the existing source with exception handlers.

10. The machine-readable medium of claim 8, wherein the compensation native code forms part of the native code corresponding to an exception handler.

11. The machine-readable medium of claim 8, further comprising generating native code to initialize the registers; and generating register-initialization exception-handling native code to handle exceptions occurring during register initialization.

12. The machine-readable medium of claim 11, wherein the register-initialization exception-handling native code allows native code corresponding to the source code block to be executed if an error occurs during register initialization.

13. The machine-readable medium of claim 8, wherein the source code is in the form of byte codes compiled by a compiler.

14. The machine-readable medium of claim 8, wherein the operations are performed by a Just-In-Time compiler.

15. An apparatus for compiling source code into native code comprising:
    a processor; and
    a memory coupled to the processor, the memory comprising instructions corresponding to an identifier to identify a source code block in source code; a transformer to transform the source code block, including transforming references to values stored in memory locations into references to corresponding values stored in registers associated with the memory locations; and a compensator to generate compensation native code to update each memory location with a value from an associated register to provide native code, corresponding to a source code exception handler associated with the source code block, access to the updated memory locations.

16. The apparatus of claim 15 comprising a generator to generate exception-handling code to handle any exception not handled by the native code corresponding to existing source code exception handlers.

17. The apparatus of claim 15 wherein the compensation native code forms part of the native code corresponding to an exception handler.

18. The apparatus of claim 15 in which the transformer generates native code to initialize the registers and register-initialization exception-handling native code to handle exceptions occurring during register initialization.

19. The apparatus of claim 18 wherein the register-initialization exception-handling native allows native code corresponding to the source code to be executed if an error occurs during register initialization.

* * * * *